United States Patent [19]

Schneider et al.

[11] 3,951,008
[45] Apr. 20, 1976

[54] POWER TRANSMITTING MECHANISM FOR STARTING A HIGH INERTIA LOAD AND HAVING RETARDER MEANS FOR AUXILIARY STARTING MOTOR

[75] Inventors: Raymond C. Schneider, Rockford; Robert W. Meyer, Pecatonica; Gerald C. Borgelt, Rockford, all of Ill.

[73] Assignee: Twin Disc, Incorporated, Racine, Wis.

[22] Filed: Jan. 8, 1975

[21] Appl. No.: 539,320

[52] U.S. Cl. .................................. 74/661; 74/720; 74/645; 74/665 R
[51] Int. Cl.² .................. F16H 37/06; F16H 47/00
[58] Field of Search ............. 74/661, 720, 718, 645, 74/665 A, 665 B, 665 C, 665 D, 665 E; 192/3.25, 3.26, 3.27

[56] References Cited
UNITED STATES PATENTS

| | | | |
|---|---|---|---|
| 1,951,875 | 3/1934 | Laabs | 74/661 |
| 2,962,597 | 11/1960 | Evans | 60/39.14 X |
| 3,683,719 | 8/1972 | Gros | 74/661 |
| 3,793,905 | 2/1974 | Black et al. | 74/661 |

*Primary Examiner*—Samuel Scott
*Assistant Examiner*—Lance W. Chandler
*Attorney, Agent, or Firm*—James E. Nilles

[57] ABSTRACT

A power transmitting mechanism for starting a load which is either of high inertia or of high starting torque and which is to be driven at a high speed through a high reduction ratio. The load has a main power source and also an axuiliary power source which initially turns over the load from a zero speed condition. After the load has been turned over by the auxiliary starting means and through a high reduction ratio, the main power source acts to slip the overrunning clutch and bring the load up to speed. The auxiliary power source has a hydraulic coupling retarder which acts to retard the auxiliary power source during its initial operation and thereby reduces its kinetic energy during its initial operation and decreases the large torque pulses which would otherwise occur in the mechanism during the start-up. The mechanism includes hydraulic control means for controlling the sequencing of the fluid fill of the hydraulic coupling retarder.

14 Claims, 7 Drawing Figures

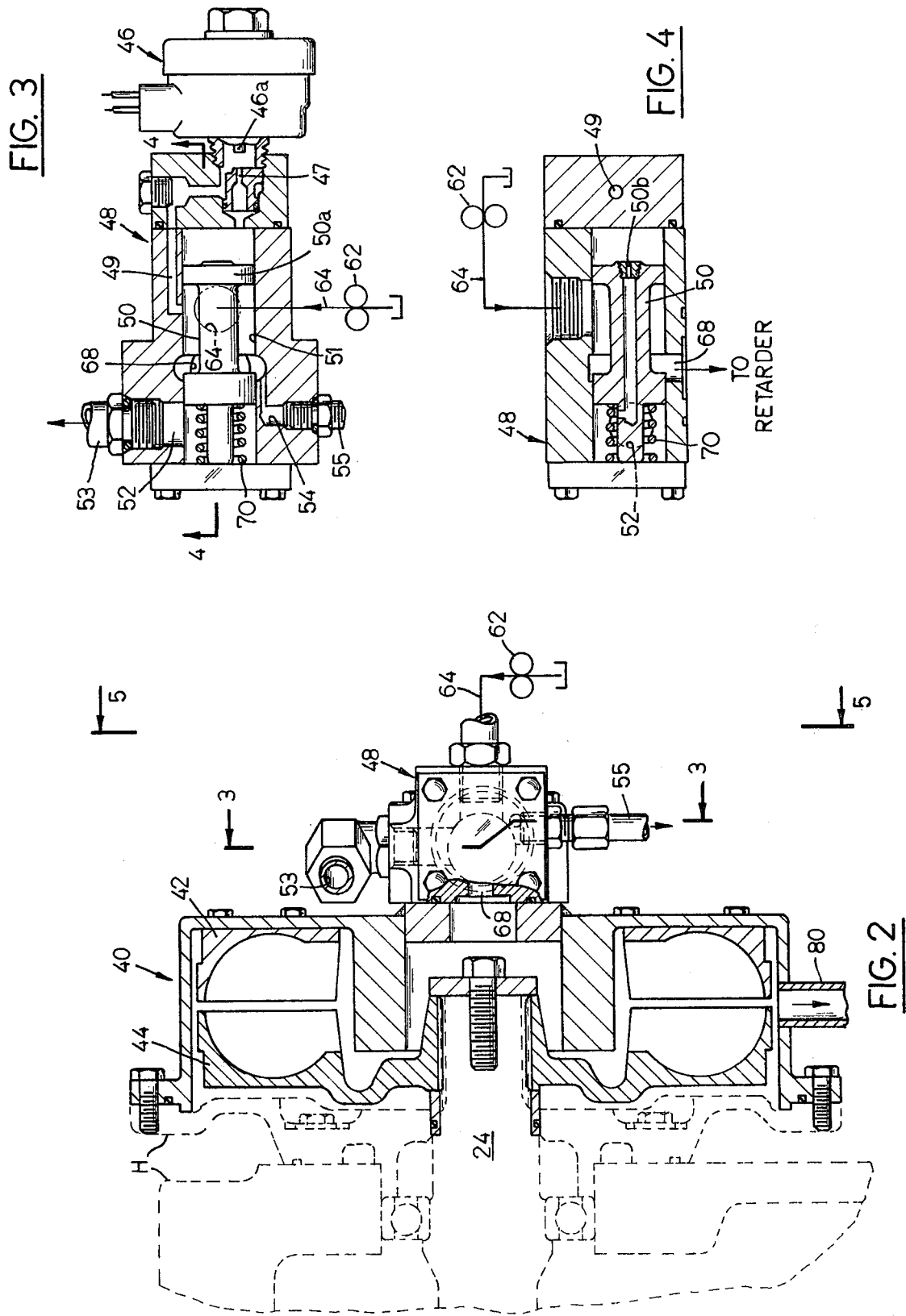

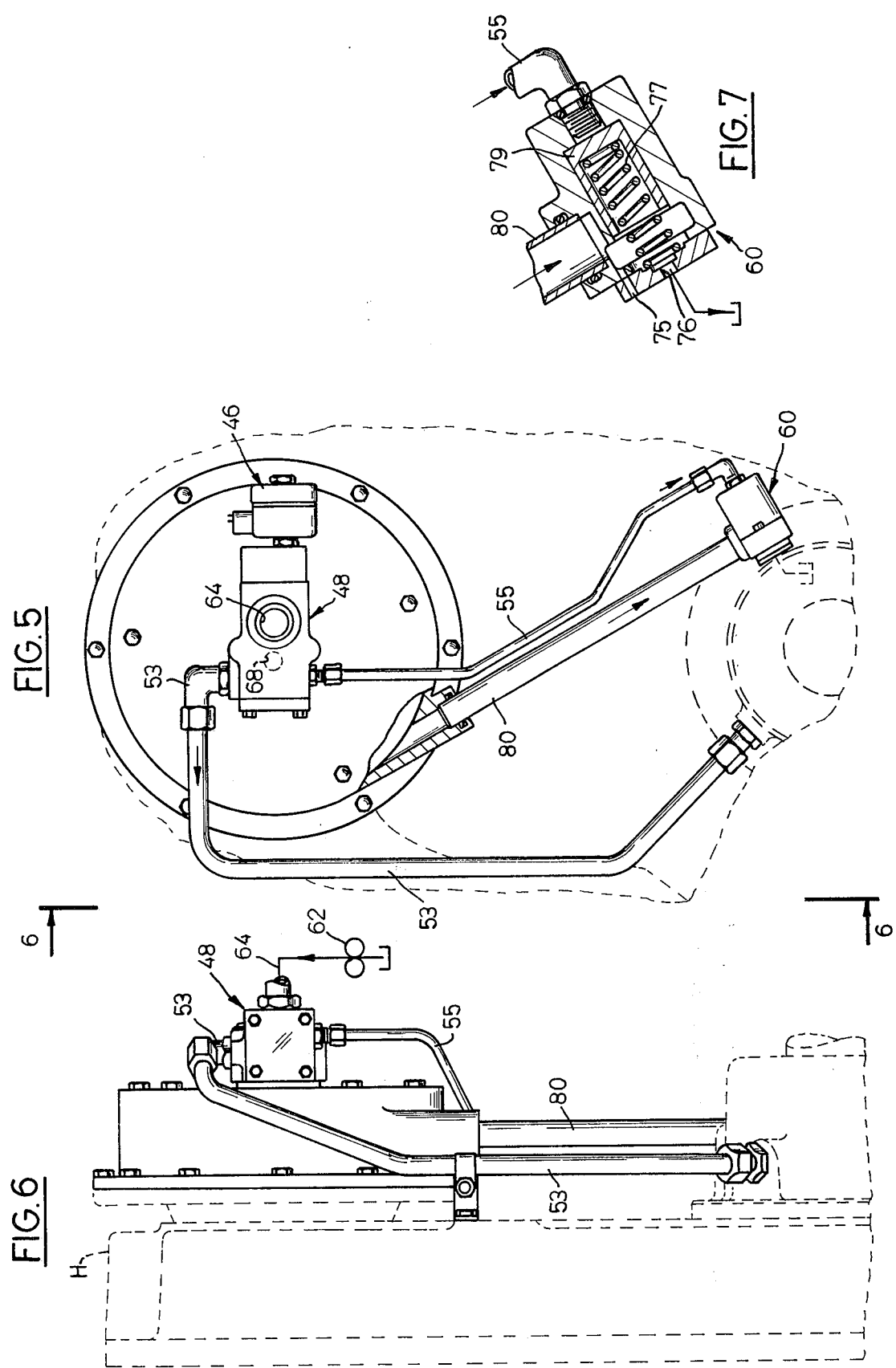

POWER TRANSMITTING MECHANISM FOR STARTING A HIGH INERTIA LOAD AND HAVING RETARDER MEANS FOR AUXILIARY STARTING MOTOR

BACKGROUND OF THE INVENTION

The invention pertains to high reduction rotational starting devices for loads which require high starting torque and very low rotating speed. These starting devices have high stored kinetic energy which can cause damage to the drive mechanism, such as shafts and gears, when the device is started.

SUMMARY OF THE INVENTION

The present invention provides a power transmitting mechanism for starting a load having high inertia or starting torque and which enables the load to be started from zero rotational speed by an auxiliary starting motor driving through an overrunning clutch and after the load has been brought up to a relatively low rotational speed, the main power source takes over and slips the overrunning clutch and drives the load up to its high speed. More specifically, the invention provides a hydraulic fluid coupling retarder for the auxiliary starting motor so that the latter is retarded during its initial operation and consequently, larger torque pulses and high kinetic energy problems of the mechanism upon starting are eliminated.

The invention also contemplates the use of fluid control means for the hydraulic coupling retarder so as to control the amount of fluid in the coupling and consequently control its retarding action.

These and other objects and advantages of the present invention will appear hereinafter as this disclosure progresses, reference being had to the accompany drawings.

BRIEF DESCRIPTION OF THE DRAWINGS

FIG. 2 is an enlarged view of the hydraulic coupling retarder shown in FIG. 1, certain parts being shown as broken away or in section for the sake of clarity;

FIG. 3 is a sectional view taken along line 3—3 in FIG. 2;

FIG. 4 is a sectional view taken generally along the line 4—4 in FIG. 3;

FIG. 5 is a transverse, elevational view taken generally from the line 5—5 in FIG. 2, certain parts being shown as broken away or in section for the sake of clarity;

FIG. 6 is an elevational view taken from line 6—6 in FIG. 5; and

FIG. 7 is a view of the dump valve shown in FIG. 5, but on an enlarged scale and in cross section.

DESCRIPTION OF A PREFERRED EMBODIMENT

Figure 1:
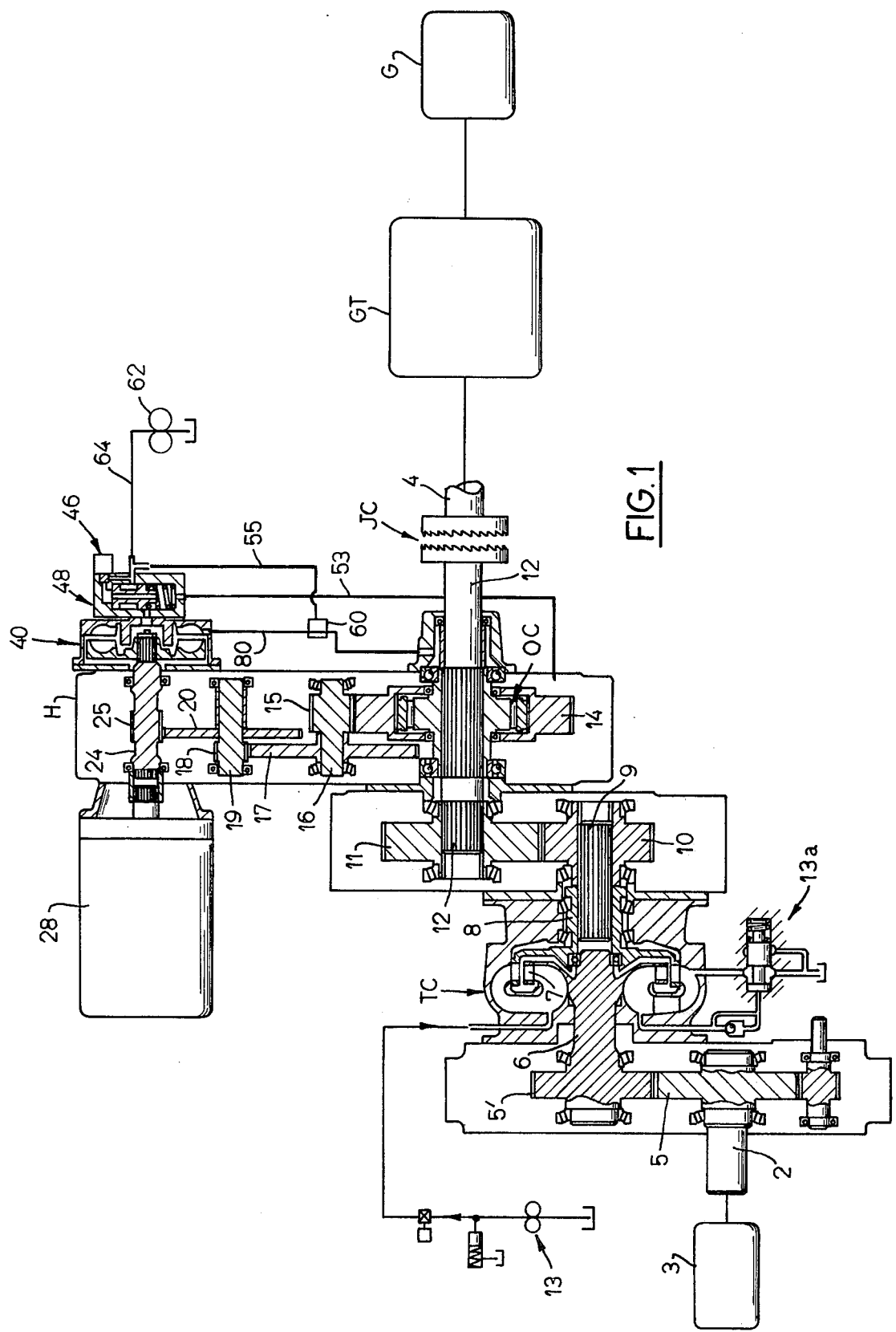
FIG. 1 is a schematic diagram of a power transmitting mechanism for a load such as a gas turbine, and which mechanism is made in accordance with the present invention.

The general organization of the power transmitting mechanism provided by the present invention is shown in FIG. 1 and includes a main power input shaft 2 which is adapted for connection to a main power source 3, such as for example, a 1,000 horsepower electric motor. Main power transmitting means connects the input shaft 2 with the power output shaft 4. This power transmitting means is shown by way of example as including a low reduction intermeshing gear 5 meshing with gear 5' fixed on shaft 6, a hydraulic torque converter TC with the pump 7 of the torque converter being connected to the shaft 6 and the converter output shaft 8 being supported by appropriate anti-friction bearing assemblies, as shown. The turbine output shaft 8 is connected by the splined shaft 9 and intermeshing gears 10 and 11 with an intermediate shaft 12. Conventional means 13 and 13a are shown for charging and dumping the torque converter.

For purposes of illustrating the invention, the main power transmitting means is shown as also including a disconnect, jaw type clutch JC of the normally open type. An overrunning clutch OC is interposed just ahead of the disconnect clutch JC and on intermediate shaft 12. Clutch OC is of the one-way, conventional type and has its large gear 14 in constant mesh with a gear 15 which in turn is fixed to shaft 16 along with the larger gear 17. Gear 17 meshes with the pinion 18 fixed on shaft 19 and which shaft also has a larger gear 20 fixed thereon. These gears and shafts thus form a high reduction gear unit.

The mechanism provided by the present invention also includes an auxiliary power input shaft 24 having a pinion 25 fixed thereon which is in constant mesh with gear 20. The auxiliary power input shaft is driven by a secondary power source, such as the auxiliary, electric starting motor 28, which for example, may be of the type developing ten horsepower at a speed of 1200 rpm. Thus, the motor 28 provides input power for the mechanism for initially starting a load, such as for example, a gas turbine, as will appear.

The output shaft 4 of the power transmitting mechanism is connected to a load having very high inertia or high friction breakaway torque. For illustrating one form of such a load and with which the invention finds considerable utility, a gas turbine GT is shown and will be described and which is of the type, for example, that operates normally at 3600 rpm. The gas turbine in turn is used to drive, for example, an electric generator G.

The load, such as a gas turbine GT, for example, is of the type having extremely high inertia and high bearing drag while at rest and it is necessary for supplying high torques to it, that is to the shaft 4 in order to break the gas turbine away that is, in order to commence turning it from zero speed.

The torque converter TC does not supply stall torque which is of sufficient magnitude to accomplish the static break-away which is necessary for the gas turbine.

The primary power source 3, driving through the torque converter TC is used to drive the gas turbine after the latter has commenced turning and reached for example, a speed of about 6 rpm. The motor 3 and torque converter then act to drive the gas turbine until the gas turbine has been accelerated from approximately 6 rpm to its firing speed. In other words, the torque converter is sized so that with its associated gearing, it can accelerate the gas turbine from approximately 6 rpm to a point where the gas turbine is able to sustain itself as well as to accelerate itself up to its rated speed. The jaw clutch JC can be disengaged when this firing point is reached and then the starting device is no longer required.

As noted above, however, the torque converter cannot supply enough stall torque to accomplish the static break-away of the gas turbine. Consequently, an auxiliary starting motor 28 is used together with the high reduction gear unit which multiplies the torque of the motor 28 sufficiently to provide static break-away of the gas turbine and acceleration of the gas turbine to, for example, approximately 6 rpm.

In this manner, the auxiliary starting motor 28 commences the turning of the gas turbine and during this initial turning of the gas turbine the torque converter TC is dumped of fluid so that it does not put an additional load on the turning gear. When the rotational speed of about 6 rpm of the gas turbine is attained, fluid is then supplied to the torque converter so that it can perform its function of accelerating the load up to its operating speed, for instance, accelerating the gas turbine to its firing speed.

Because of the extremely high ratio (for example 193:1) in the turning geat unit, the turning gear motor 28 would be for over-speeded when the torque converter is accelerating. For this reason, the one-way overrunning clutch OC of the conventional cam and roller type is placed between the high ratio gear unit and the output shaft 4. When the output side of this one-way clutch OC is driven faster than the input side, there is a positive disengagement and the driving motor 28 and its associated gearing may free-wheel at a no-load speed. Electric power to the drive motor 28 is then disconnected and it will go to zero speed.

The one-way overrunning clutch OC is sized to carry the multiplied torque of the driving motor 28. In a dynamic situation however, the one-way clutch OC and all of the other parts of the drive train receive an additional shock load due to the stored kinetic energy in the rotor of the driving motor 28. Because of the back-lash in the gearing and in the jaw clutch and also because of the torsional resiliency of the free-wheel itself, the motor 28 actually reaches a relatively high speed before the free-wheel of the overrunning clutch OC locks up. This high speed acts to store kinetic energy in the rotor of the motor 28 which places an oscillating torque on the free-wheel of the overrunning clutch and on other parts of the drive train, which torque is approximately twice as high as a normally steady-state torque. The kinetic energy is proportional to the square of the speed of the motor 28. When the back-lash of the system is finally taken up, this stored energy causes a high shock load on the free wheels, jaw clutches, gears and shafts. Because of the high reduction ratio of the gear system and the considerable amount of back-lash in the system, the driving motor 28 of the turning gear may achieve close to its rated speed before this back-lash is taken up.

In accordance with the present invention, means are provided for retarding, that is limiting and controlling the speed of the turning gear motor 28 during its initial operation and thereby limiting the shock load placed on the entire system.

Hydraulic retarder means are provided for the auxilary power input motor 28 and which reduces the kinetic energy and overcomes the large torque pulses on starting. This means comprises a fluid coupling 40 which has a first bladed portion 42 that is rotationally fixed or anchored to the housing H of the mechanism, as clearly shown in FIG. 2. The fluid coupling also has a second bladed portion 44 which is fixed to the auxiliary power input shaft 24 and is driven thereby and from the starting motor 28. Generally, the coupling 40 is initially full of fluid so that it will act as a high capacity retarder. As a result, the motor 28 will itself accelerate only to a speed which matches its ability to supply torque to the absorbing capacity and consequently, the stored kinetic energy will be relatively low.

After a time delay which is long enough for the motor 28 to reach this speed, an electrical signal triggers the solenoid actuator 46 (FIG. 3) which in turn is connected to and actuates a fluid control valve 48.

Turning more specifically to the valve 48, it includes an axial shiftable spool 50 in bore 51, a by-pass 49, a fixed orifice 47, a fluid pressure output 52, which via exhaust conduit 53 dumps fluid to the housing H. The valve also includes an outlet 54 which via conduit 55 conducts high prressure fluid to a dump valve 60 (FIGS. 5 and 7). High pressure fluid from a power source, such as a pump 62 FIGS. 1, 2, 3, 4, 6) enters the control valve 48 via conduit 64. An outlet 68 (FIGS. 2 and 3) from the valve 48 conducts pressure fluid to the hydraulic coupling 40.

The solenoid actuator 46 is of the normally open type and is shown in the normal situation where it permits the hydraulic coupling to be full of fluid. This solenoid actuator 46 is actuated when an electrical signal is present causing its plunger 46a to shift to the left, blocking orifice 47 and consequently the by-pass 49, thereby permitting the dumping sequence. The valve 48 is shown in FIG. 3 in its normal position, i.e., when the coupling 40 is full of fluid because high pressure fluid can flow from inlet 64 and through outlet 68 to the coupling.

The spool 50 is shifted to the right when the solenoid actuator is actuated by an electrical signal to shift its plunger 46a to the left, as mentioned. Shifting plunger 46a to the left causes pressure fluid flow to be blocked in by-pass 49 of the valve, and from the right end of the spool 50. A spring 70 then causes the spool 50 to move to the right to the coupling dump position. Orifice 50b in the spool permits trapped fluid at the right end of the spool 50 to be bled to dump. As the fluid is dumped from the coupling, the capacity of the coupling 40 diminishes and more motor torque is then available to accelerate the motor 28 and its associated parts. Because the result is a gradual increase of torque, the shock on the over-running clutch flywheel and other parts will be minimized.

After the load has been started, the electrical signal is removed from actuator 46, thereby permitting the coupling 40 to be filled, so that it can act as a retarder, and prevent the turning gear motor 28 from overspeeding.

The fluid control circuit also includes the dump valve 60 (FIG. 5 and 7) which acts to control the fluid dumping action of the coupling 40. The dump valve normally limits the flow from the coupling to about 5 gallons per minute through orifice 75. The flow of fluid through the dump valve 60 is held down by high pressure from the valve 48 via the conduit 55, which shifts the piston 79 to the left so that dump port 76 is covered. When the piston is in this position orifice 75 bleeds fluid from the coupling. When the high fluid pressure in conduit 55 is interrupted, a return spring 77 of the dump valve moves the shiftable piston 79 to the right so the dump port 76 is opened or uncovered and thus permits rapid dumping of the coupling 40 through the relatively large exhaust conduit 80 extending from the interior of the coupling. The valve 79 is shown in the dump position in FIG. 7 where the piston 79 has been moved to the right to uncover dump port 76. The exhaust conduit 80 continually bleeds the coupling for cooling purposes.

The present invention provides a grounded fluid coupling for the auxiliary starting motor of a power transmitting mechanism of a gas turbine starter. The fluid coupling limits the speed of the auxiliary motor initially and consequently limits the shock load on the entire system. The retarder prevents the otherwise high speed of the auxiliary starter motor from storing up a large amount of kinetic energy which would otherwise cause high shock loads on the various parts when the backlash in the system was finally taken up.

The grounded or stalled coupling of the present invention can be used as a safety device if the overrunning clutch free-wheel should lock up in a starting mode because the coupling could be filled and its retarding effect would prevent the system from overspeeding.

Furthermore, if it is desired to control the rate of acceleration of the load, the grounded coupling could be utilized for this function since its torque absorption is proportional to the amount it is filled with fluid, and the amount of torque available for acceleration can be modulated by controlling the amount and rate of fluid fill of the coupling.

We claim:

1. A power transmitting mechanism for starting a load and comprising, a main power input shaft adapted for connection to a main power source; main drive transmitting means connected at its input side in driven relation with said main power input shaft, and a disconnect clutch connected at the output side of said drive transmitting means; an auxiliary power input shaft adapted for connection with an auxiliary starting motor, and one-way drive establishing connecting means operatively interposed between said auxiliary power input shaft and said main drive transmitting means, a hydraulic fluid coupling having a first portion stationarily anchored and a second portion connected with and driven by said auxiliary power input shaft, and fluid control means for controlling the amount of fluid fill of said hydraulic coupling whereby said coupling can act as a retarder for said auxiliary starting motor, said one-way drive establishing connecting means having an input side connected with said auxiliary power input shaft and said hydraulic fluid coupling and an output side drivingly connected with said main drive transmitting means.

2. The mechanism set forth in claim 1 further characterized in that the fluid control means includes a first valve having a shiftable valve element for maintaining said fluid coupling full of fluid during initial operation of said auxiliary starting motor and for regulating the amount of pressure fluid which enters said coupling.

3. The mechanism set forth in claim 2 further characterized in that said fluid control means includes a fluid dump valve in communication with said coupling and also with said first valve, said dump valve being of the normally open type to permit continual dumping of said coupling, said dump valve being modulatable by pressure fluid from said first valve to thereby regulate bleeding of fluid from said coupling.

4. The mechanism set forth in claim 1 further characterized in that said one-way drive establishing means comprises a one-way overrunning clutch located between said auxiliary starting motor and said disconnect clutch.

5. The mechanism set forth in claim 2 further characterized in that said one-way drive establishing means comprises a one-way overrunning clutch located between said auxiliary starting motor and said disconnect clutch.

6. The mechanism set forth in claim 3 further characterized in that said one-way drive establishing means comprises a one-way overrunning clutch located between said auxiliary starting motor and said disconnect clutch.

7. A power transmitting mechanism for starting a gas turbine and comprising, a main power input shaft adapted for connection to a main power source; main drive transmitting means including a hydraulic torque converter connected at its input side in driven relation with said main power input shaft, and a disconnect clutch connected with the output side of said torque converter; an auxiliary power input shaft adapted for connection with an auxiliary starting motor, and one-way drive establishing connecting means operatively interposed between said auxiliary power input shaft and said disconnect clutch; a hydraulic fluid coupling having a first portion stationarily anchored and a second portion connected with and driven by said auxiliary power input shaft, and fluid control means for controlling the amount of fluid fill of said hydraulic coupling whereby said coupling can act as a retarder for said auxiliary starting motor, said one-way drive establishing connecting means having an input side connected with said auxiliary power input shaft and said hydraulic fluid coupling and an output side drivingly connected with said disconnect clutch.

8. The mechanism set forth in claim 7 further characterized in that the fluid control means includes a first valve having a shiftable valve element for maintaining said fluid coupling full of fluid during intitial operation of said auxiliary starting motor and for regulating the amount of pressure fluid which enters said coupling.

9. The mechanism set forth in claim 8 further characterized in that said fluid control means includes a fluid dump valve in communication with said coupling and also with said first valve, said dump valve being of the normally open type to permit continual bleeding of said coupling, said dump valve being modulatable by pressure fluid from said first valve to thereby regulate dumping of fluid from said coupling.

10. A power transmitting mechanism for starting a gas turbine and comprising, a main power input shaft adapted for connection to a main power source; main drive transmitting means including a hydraulic torque converter connected at its input side in driven relation with said main poweer input shaft, and a disconnect clutch connected with the output side of said torque converter, an auxiliary power input shaft adapted for connection with an auxiliary starting motor, a one-way overrunning clutch operatively located between said auxiliary power input shaft and said disconnect clutch; a hydraulic fluid coupling having a first portion stationarily anchored and a second portion connected with and driven by said auxiliary power input shaft, and fluid control means including a first valve having a shiftable valve element for maintaining said fluid coupling full of fluid during initial operation of said auxiliary starting motor and for regulating the amount of pressure fluid which enters said coupling, whereby said coupling can act as a retarder for said auxiliary starting motor, said fluid control means also including a fluid dump valve in communication with said coupling and also with said first valve, said dump valve being of the normally open type to permit continual bleeding of said coupling, said dump valve being modulatable by pressure fluid from said first valve to thereby regulate dumping of fluid from said coupling.

11. A power transmitting mechanism for starting a gas turbine and comprising, a main power source, a main power input shaft connected to said main power source, main drive transmitting means including a hydraulic torque converter connected at its input side to and in driven relation with said main power input shaft, and a disconnect clutch connected with the putput side of said torque converter; a power output shaft connected to the power output side of said disconnect clutch, a gas turbine connected to and driven by said power output shaft, an electrical generator connected to and driven by said gas turbine, an auxiliary starting motor, an auxiliary power input shaft connected to and driven by said auxiliary starting motor, one-way drive establishing connecting means operatively interposed between said auxiliary power input shaft and said disconnect clutch; a hydraulic fluid coupling having a first portion stationarily anchored and a second portion connected with and driven by said auxiliary power input shaft, and fluid control means for controlling the amount of fluid fill of said hydraulic coupling whereby said coupling can act as a retarder for said auxiliary starting motor.

12. A power transmitting mechanism for starting a load and comprising, a main power input shaft adapted for connection to a main power source; main drive transmitting means connected at its input side in driven relation with said main power input shaft, and a disconnect clutch connected at the output side of said drive transmitting means; an auxiliary power input shaft adapted for connection with an auxiliary starting motor, and one-way drive establishing connecting means operatively interposed between said auxiliary power input shaft and said main drive transmitting means, a variably actuatable retarding means connected to said auxiliary power input shaft and control means for selectively actuating said retarding means whereby said retarding means can initially retard the speed of said auxiliary starting motor and subsequently permit said auxiliary starting motor to achieve a speed greater than the initial speed, said one-way drive establishing means having an input side connected with said auxiliary power input shaft and said retarding means and an output side drivingly connected with said main drive transmitting means.

13. A power transmitting mechanism for starting a load and comprising; a main power input shaft adapted for connection to a main power source; main drive transmitting means connected at its input side in driven relation with said main power input shaft, and a disconnect clutch connected at the output side of said drive transmitting means; an auxiliary power input shaft adapted for connection with an auxiliary starting motor, and one-way drive establishing connecting means operatively interposed between said auxiliary power input shaft and said main drive transmitting means, a hydraulic fluid coupling having a first portion stationarily anchored and a second portion connected with and driven by said auxiliary power input shaft, and fluid control means for controlling the amount of fluid fill of said hydraulic coupling whereby said coupling can act as a retarder for said auxiliary starting motor, fluid control means including (1) a first valve having a shiftable valve element for maintaining said fluid coupling full of fluid during initial operation of said auxiliary starting motor and for regulating the amount of pressure fluid which enters said coupling, and (2) including a fluid dump valve in communication with said coupling and also with said first valve, said dump valve being of the normally open type to permit continual dumping of said coupling, said dump valve being modulatable by pressure fluid from said first valve to thereby regulate bleeding of fluid from said coupling.

14. A power transmitting mechanism for starting a gas turbine and comprising, a main power input shaft adapted for connection to a main power source; main drive transmitting means including a hydraulic torque converter connected at its input side in driven relation with said main power input shaft, and a disconnect clutch connected with the output side of said torque converter; an auxiliary power input shaft adapted for connection with an auxiliary starting motor, and one-way drive establishing connecting means operatively interposed between said auxiliary power input shaft and said disconnect clutch; a hydraulic fluid coupling having a first portion stationarily anchored and a second portion connected with and driven by said auxiliary power input shaft, and fluid control means for controlling the amount of fluid fill of said hydraulic coupling whereby said coupling can act as a retarder for said auxiliary starting motor; said fluid control means including a first valve having a shiftable valve element for maintaining said fluid coupling full of fluid during initial operation of said auxiliary starting motor and for regulating the amount of pressure fluid which enters said coupling; said fluid control means also including a fluid dump valve in communication with said coupling and also with said first valve, said dump valve being of the normally open type to permit continual bleeding of said coupling, said dump valve being modulatable by pressure fluid from said first valve to thereby regulate dumping of fluid from said coupling.

* * * * *